United States Patent
Krause et al.

(10) Patent No.: US 6,315,331 B1
(45) Date of Patent: Nov. 13, 2001

(54) MOLDED HOSE JOINT ASSEMBLY

(75) Inventors: Keith M. Krause, Westminster; Melvin L. Marriott, Littleton, both of CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/267,215

(22) Filed: Mar. 12, 1999

Related U.S. Application Data

(60) Provisional application No. 60/077,981, filed on Mar. 13, 1998.

(51) Int. Cl.$^7$ ............................................. F16L 41/00
(52) U.S. Cl. .................................. 285/133.11; 285/293.1; 285/133.5
(58) Field of Search ........................... 285/133.11, 133.5, 285/FOR 38, 293.1, 294.1

(56) References Cited

U.S. PATENT DOCUMENTS

| | | |
|---|---|---|
| 4,903,998 | 2/1990 | Stanley . |
| 4,997,213 | 3/1991 | Traner et al. . |
| 5,033,775 | 7/1991 | Matte et al. . |
| 5,181,747 | 1/1993 | Jovero . |
| 5,248,171 | 9/1993 | Briet . |
| 5,295,719 | 3/1994 | Dal Palu' . |
| 5,299,839 | 4/1994 | Mogavero . |
| 5,411,300 | 5/1995 | Mitsui . |
| 5,415,825 | 5/1995 | Sellers . |
| 5,447,341 | 9/1995 | Hartel et al. . |
| 5,460,762 | 10/1995 | Andre . |
| 5,568,949 | 10/1996 | Andre . |
| 5,573,283 | 11/1996 | Sellers et al. . |
| 5,605,355 | 2/1997 | Andre . |
| 5,743,569 * | 4/1998 | Deters et al. .................... 285/133.11 |

FOREIGN PATENT DOCUMENTS

| | | |
|---|---|---|
| 0 312 758 A1 | 4/1989 | (EP) . |
| 0 506 017 A2 | 9/1992 | (EP) . |
| 0 564 990 A1 | 10/1993 | (EP) . |
| 332632/1992 | 5/1991 | (JP) . |

* cited by examiner

Primary Examiner—Eric K. Nicholson
(74) Attorney, Agent, or Firm—M. S. Olson, Esq.; C. H. Castleman, Esq.; S. G. Austin, Esq.

(57) ABSTRACT

Molded hose joint assemblies, e.g., connections, branched hoses and bleeding devices for fluid circuits, and especially such assemblies for use in automotive and industrial coolant circuit assemblies, which assemblies comprise a reduced amount of molded outer covering element over prior art designs, said covering element substantially encapsulating the connection points of generally flexible hose ends to generally rigid inner connection members. The outer covering element forms a unitary mass or interconnecting rings about at least two such hose connection points. Flexible manufacturing techniques for producing such assemblies are provided.

14 Claims, 4 Drawing Sheets

MOLDED HOSE JOINT ASSEMBLY

This application claims the benefit of U.S. Provisional Application No. 60/077,981, filed Mar. 13, 1998.

BACKGROUND OF THE INVENTION

The present invention relates to hose joint assemblies, e.g., connections, branched hoses and bleeding devices for fluid circuits, and especially to such assemblies for use in automotive and industrial coolant circuit assemblies and to processes for manufacturing such assemblies.

Hose joint assemblies, and in particular such assemblies used in fluid circuits for automotive and/or industrial processes, operate in exceedingly harsh environments. Factors including varying pressures and temperatures at different points of an assembly, varying diameters of different hoses in a particular circuit, as well as chemical exposure result in the need for highly rigorous hose assemblies. For these systems to operate effectively, the connections between the hose and the inner connection members to which they are sealed must be fluid tight and must be able to resist separations caused by fluid pressure. This mode of separation is known as blow-off Separation of the hose from the fixtures may also occur as a result of environmental interference, which mode of separation is known as pull-off.

A branched rubber hose is a difficult article to manufacture in great numbers with efficiency and economy, and many previous attempts at manufacturing such assemblies have resulted in products that were not entirely reliable against leakage in use. Known hose joint assemblies generally include rubber hoses, the end portions of which are sealed to generally rigid inner connection members by means of a sealing mechanism. Three types of sealing mechanisms for connecting the rigid inner connection members of such assemblies, e.g., those in the shape of T's, Y's, X's, elbows and so forth, to the flexible hose components include metal clamps, shrink bands or clamps, and molding techniques.

Metal clamp-type sealing mechanisms suffer from a host of drawbacks, including a susceptibility to corrosion, a susceptibility to pull-off and difficulty of installation due to clamp protrusions, and a susceptibility to blow-off due in part to the compression set of the materials and the inability of the metal clamps to respond to such dimensional changes. Shrink band techniques, wherein polymeric bands are placed about the connection points of such assemblies and allowed to contract resulting in a compressive connection, generally address the corrosion, pull-off and installation problems associated with metal clamps. The additional logistical and manufacturing steps and costs associated with forming and storing the shrink bands however makes this technology relatively expensive. Molded sealing techniques, wherein a thermoset or plastics material is molded about the connection point of an assembly and is cured or allowed to harden, resulting in a compressive type seal about a hose connection point, eliminate the additional steps and costs of manufacturing and storing bands. In this method, the seal about the inner connection point is formed directly on the joint assembly itself; molding material is formed in such a way as to essentially encapsulate the inner connection member and hose ends. But this method is still somewhat burdensome; relatively large amounts of molding material are generally used to encapsulate the entire joint portion of the assembly, and where such material is reduced to save on costs, the integrity of the seals or the stability of the assembly is generally compromised.

Various prior attempts to reduce the cost of such molded hose joint assemblies without compromising the integrity of the seals or the stability of the assembly have met with varying success. One attempt involves the elimination of a portion of the molding material required to encapsulate a joint assembly via the use of permanent external runners or external bridges which connect one band about one hose connection point with another band about another hose connection point. External runners or bridges between hose connection points allow molding material to flow during the molding process from one hose connection point to another without encapsulating the mid-portion or trunk of the inner connection member, i.e., without encapsulating the entire joint portion. A drawback of this method however is in the increased possibility of independent rotation of the different hoses compared to prior art designs; it is believed that the external runners or bridges do not provide the stability provided by the fully encapsulating molding, i.e., that technique whereby the outer covering element encapsulates the hose connection points and the entire trunk of the inner connection member. Moreover, because the molding material must be forced through generally narrow external runners, the molding operation must take place at relatively high pressures and temperatures, resulting in increased production costs. These higher temperatures moreover result in increased cool down periods for the plastics molding material, thus further increasing production time and decreasing production efficiencies. The generally permanent external runners or bridges between hose connection points also pose the possibility of increased environmental interference, i.e., entanglement with other objects in the vicinity of the assembly.

Thus, a need exists for a durable, long-life molded hose joint assembly which is resistant to independent rotation of the individual hose members, but is efficient, economical and easy to manufacture.

Accordingly, it is a primary object of the present invention to provide a molded hose joint assembly which is efficient, economical and easy to manufacture, and minimizes the risk of independent rotation of the several hose members.

It is a further object of the present invention to provide such an assembly which can be utilized in automotive and/or industrial coolant circuit systems.

It is yet another object of the present invention to provide such a hose joint assembly which adequately addresses hose pull-off and blow-off concerns.

It is yet another object of the present invention to provide an improved method for manufacturing such hose joint assemblies, which method involves a relatively low cost alternative to prior art methods.

SUMMARY OF THE INVENTION

To achieve the foregoing and other objects and in accordance with a purpose of the present invention as embodied and broadly described herein, a molded hose joint assembly is provided comprising a substantially rigid inner connection member having at least two hose connection ports and a trunk portion. The assembly furthermore includes at least two flexible hoses, each hose being joined at one end to the inner connection member at a hose connection port to form a hose connection point. The assembly also includes an outer sealing band or covering element engaging at least a portion of each of the hoses at a hose connection point, for substantially sealing the hose to the inner connection member. The hose joint assembly is characterized in that the outer covering element forms a unitary mass in the form of interconnected bands about at least two of the hose connection points in the absence of external runners or bridges, to form one or more hose connection intersection regions, but the portion of the inner connection member trunk apart from the hose connection intersection region remains substantially free of the covering element, to define a non-intersecting region.

In a further embodiment of the present invention, such a molded hose joint assembly for use in an automotive or industrial coolant system is provided.

In yet another embodiment of the present invention, a method is provided for forming the inventive molded hose joint assemblies, which method involves the utilization of flexible manufacturing techniques.

BRIEF DESCRIPTION OF THE DRAWINGS

The accompanying drawings which are incorporated in and form a part of the specification, illustrate preferred embodiments of the invention, and together with a description, serve to explain the principles of the invention. In the several drawings, like numerals designate like parts, and.

DESCRIPTION OF THE PREFERRED EMBODIMENTS

Figure 1:
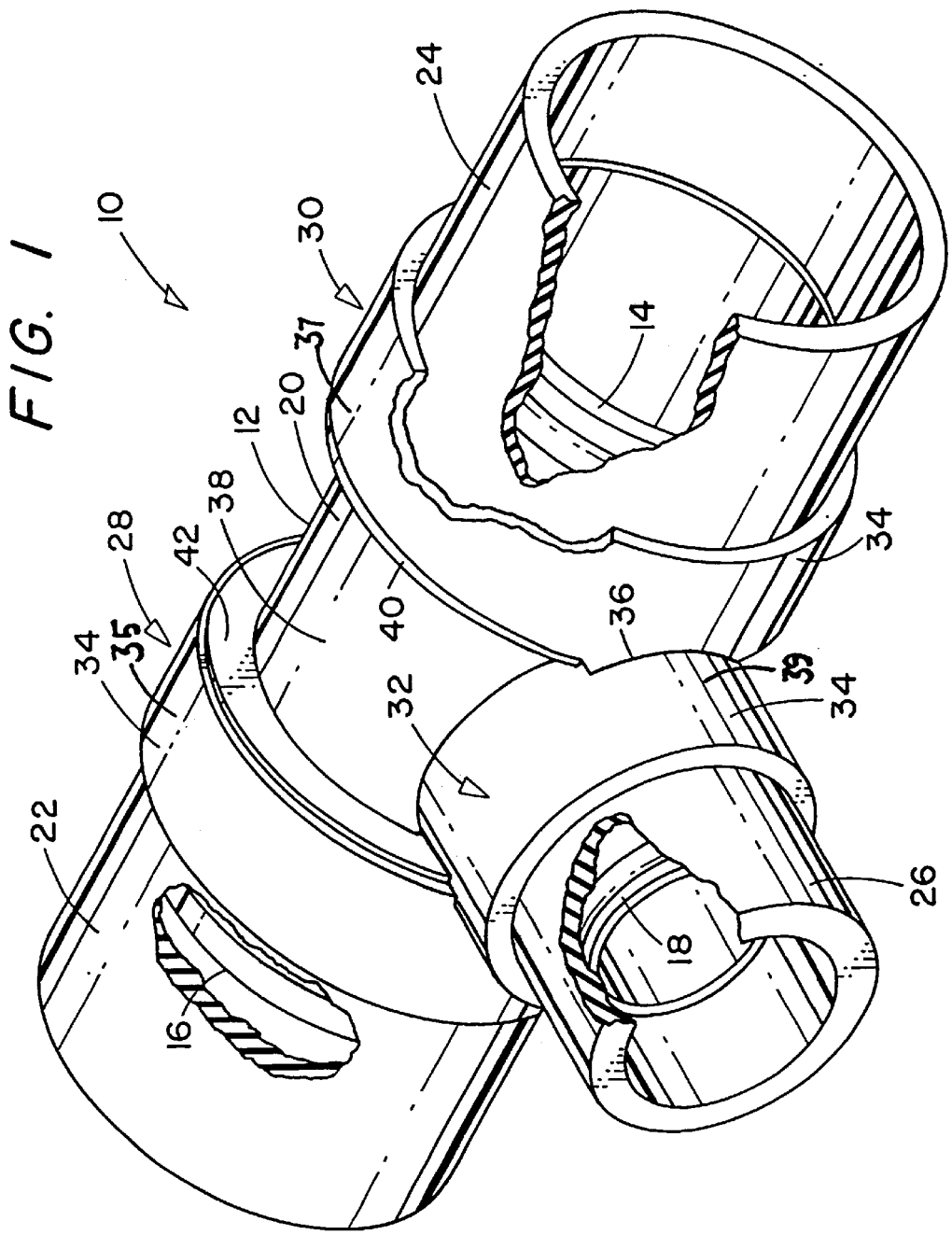
FIG. 1 is a perspective view of an embodiment of the present invention in the form of a "T"-shaped hose joint assembly, in which portions are shown in partial cut-away view to reveal the construction of a hose joint assembly of the present invention.

Referring to FIG. 1, one embodiment of the present invention is shown in the form of a "T"-shaped hose joint assembly. In the embodiment shown, a hose joint assembly 10 includes a substantially rigid inner connection member 12 having at least two ends defining hose connection ports 14, 16, and in the embodiment shown includes an additional such port in the form of a stem 18. The inner connection member 12 includes a trunk portion 20. The assembly furthermore includes at least two flexible hoses 22, 24, 26 each hose being joined at one of its ends to the inner connection member 12 at a hose connection port 14, 16, 18 to form a hose connection point 28, 30, 32.

The assembly also includes an outer covering element 34 engaging at least a circumferential portion of each of the hoses 22, 24, 26 at a hose connection point 28, 30, 32, for substantially sealing the hose 22, 24, 26 to the inner connection member 12. The hose joint assembly 10 is characterized in that the outer covering element 34 forms a unitary mass about at least two of the hoses 22, 24, 26 at a hose connection point 28, 30, 32 to form at least one hose connection point intersecting region 36, one such region being visible in the view shown in FIG. 1. The unitary mass is in the form of interconnected bands 35, 37, 39. Each band 35, 37, 39 forms a circumferential ring about a hose connection point 28, 30, 32. Each band 35, 37, 39 moreover merges with, or includes an interconnection 72, with at least one other such band at a tangent point between such bands. This interconnection among bands defines the unitary mass characteristic of the outer covering element of the present invention. The portion of the trunk portion 20 of the inner connection member 12 outside of or apart from the intersecting region 36 remains substantially free of the outer covering element 34, to define a non-intersecting, or encapsulant-free, region 38.

Figure 2:
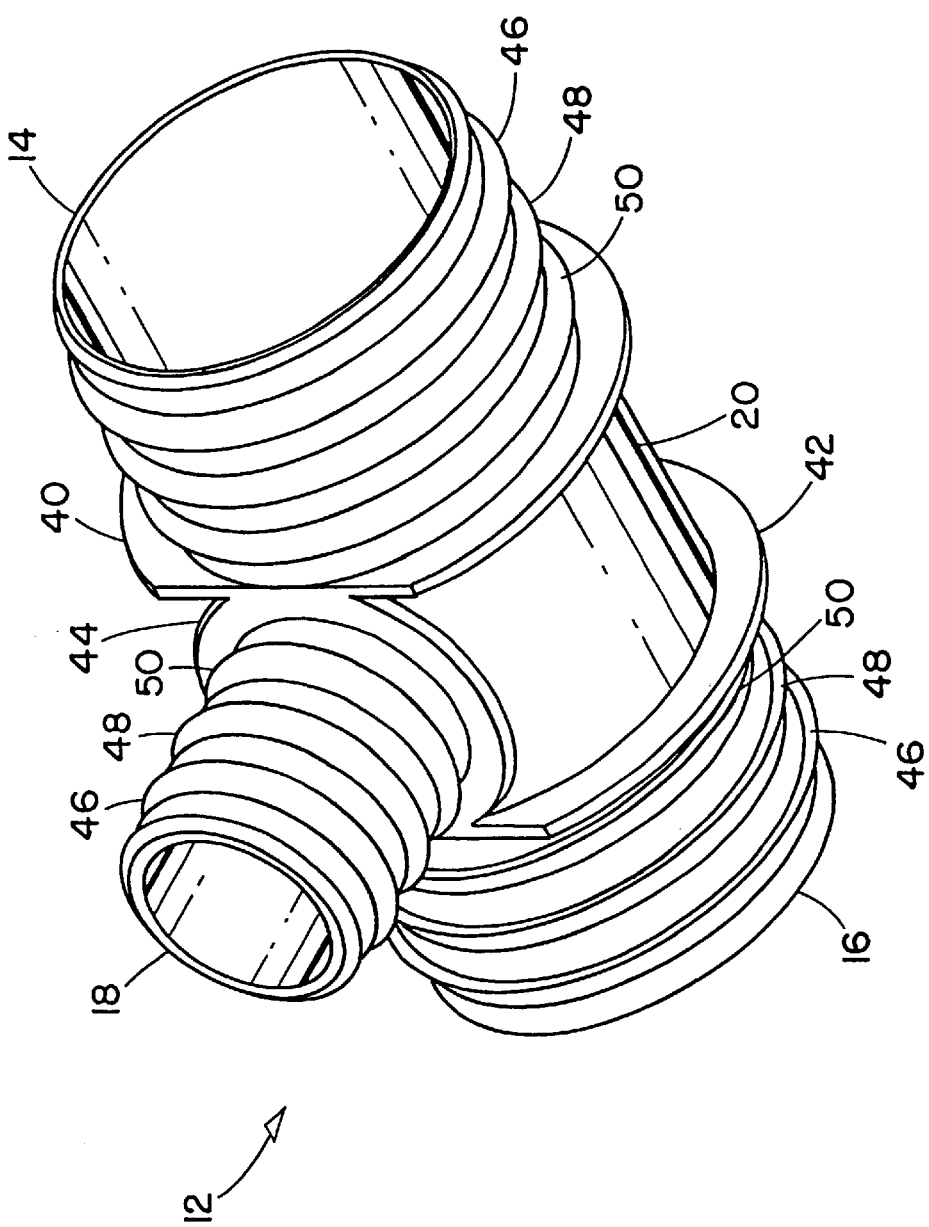
FIG. 2 is a perspective view of an inner connection member of one embodiment of the present invention in the form of an "T"-shaped inner connection member.
Figure 3:
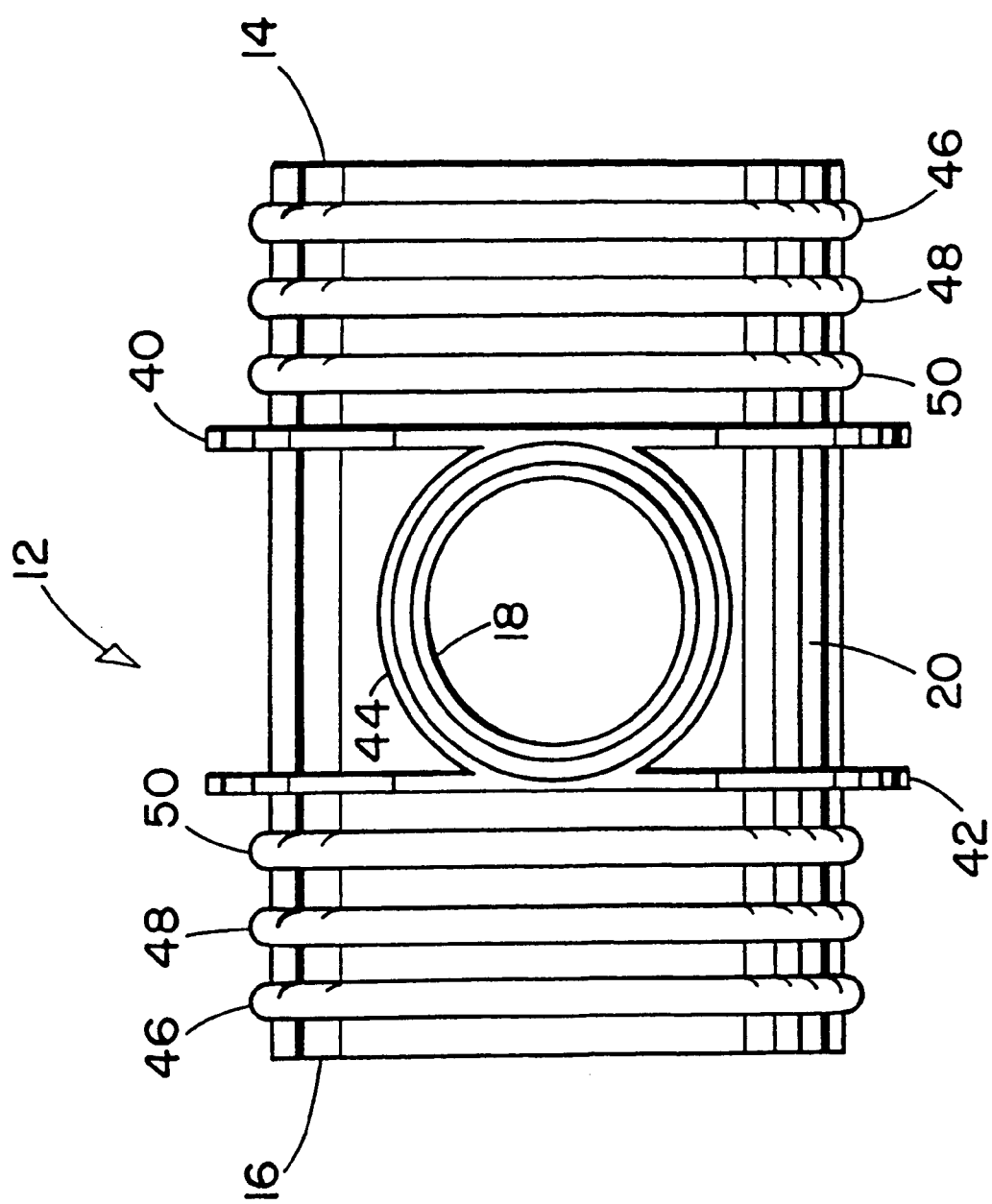
FIG. 3 is a top of the "T"-shaped inner connection member shown in FIG. 2.

Referring to FIGS. 2 and 3, an inner connection member useful in one embodiment of the present invention is shown in the form of a "T"-shaped inner connection member 12. In the embodiment shown, the substantially rigid inner connection member 12 is shown having at least two hose connection ports 14, 16, and in the embodiment shown includes an additional such port in the form of a stem 18. The inner connection member 12 also includes a trunk portion 20. The inner connection member 12 of the embodiment of the invention shown in FIGS. 1, 2 and 3 furthermore includes at least one raised, generally circumferential rib which defines a hose stop 40, 42, 44 extending axially from the inner connection member 12 between the trunk portion 20 and the hose connection ports 14, 16, 18 thereof In a preferred embodiment of the present invention, hose connection ports would be inserted into the ends of hose such that the hose end 22, 24, 26 would abut the hose stop 40, 42, 44, thus providing additional stability to the assembly prior to molding of the outer covering element, and improving ease of manufacture of the assembly. The type of hose stop shown in FIGS. 1, 2 and 3, in the form of a raised rib, is distinguishable from the step-type hose stop used in conventional molded hose joint assemblies, which latter design requires additional inner connection member material, and hence more cost, in the trunk area.

Several additional circumferential ribs 46, 48, 50 are shown in the preferred embodiment of FIGS. 2 and 3, between the hose stops 40, 42, 44 and the distal ends of the hose connection ports 14, 16, 18, which secondary ribs 46, 48, 50 are shown as being preferably of lesser height than the hose stops 40, 42, 44, and optionally may also angled or fish-tailed slightly away from the trunk portion 20 of the inner connection member 12. These ribs could also be angled toward the trunk portion however. These additional ribs 46, 48, 50 in either configuration are optional, and are designed to increase the engagement of the hose to the inner connection member 12. While an embodiment of the present invention in the shape of a "T" is shown in FIGS. 1, 2 and 3, one skilled in the art would readily recognize that the invention could be applied to a hose joint assembly having any appropriate or suitable shape, wherein at least two of the hose connection points are located sufficiently near one another to allow for the construction of a hose connection intersecting region 36 as described supra and below. Such configurations include but are not limited to hose joint assemblies in the shapes of an "X", a "Y", an elbow, etc.

As can be seen in the embodiments shown in FIGS. 2 and 3, two of the otherwise-circular raised rib-type hose stops 40, 42 are substantially flattened where they intersect with the stem hose stop 44, i.e., they form an incomplete ring in the area at which they merge with the stem hose stop 44. The stem hose stop 44 however, as can be clearly seen in the embodiment shown in FIG. 3, forms a complete ring about the stem 18.

This optional but preferred flattening-out or leveling-off of one or more select hose stops where it merges with another hose stop allows various hose connection points to be located sufficiently close to one another so that, in a preferred embodiment the molding material defining the outer covering element can be formed about two or more of the hose connection points as a unitary mass, i.e., as tangentially interconnected bands, without the need for external runners or bridges. In order to effect this, the mold or molds useful in forming the outer covering element may be formed and shaped so that there are "merge cavities" or internal flow paths which allow for the flow of molding material in the molding process from one hose connection point to another. These flow paths are located at the tangent points at which adjacent hose connection points meet. In the preferred embodiment shown in FIGS. 2 and 3, the area in which two or more such adjacent hose connection points meet is substantially the same as that wherein adjacent hose stops merge. These areas generally define the hose connection intersecting regions or hose connection intersections. Thus, according to this embodiment of the present invention, molding material covers only that portion of the trunk located within an intersecting region, but the remainder of the trunk may in this way remain free of the outer covering element. This phenomenon is apparent from a view of FIGS. 1, 2 and 3, and represents potentially significant material cost savings. In the embodiment shown in FIG. 1, the location of the merge cavities of the respective covering element molds is evident by the manner in which the covering element 34 about the stem 18 encapsulates the hose connection point 32 to a point on the trunk 20 of the inner connection member 12, but extends only up to the hose stops 40, 42 of the remaining two hose connection points 28, 30.

As is readily apparent from an inspection of the figures and accompanying descriptions provided, the present invention makes it possible to significantly reduce the manufacturing costs associated with molded hose joint assemblies by eliminating a large amount of the outer covering element in the area of the inner connection member trunk compared to conventional designs. By eliminating the need for external runners or bridges the possibility of hose pull-off is moreover reduced. Notably, by forming unitary masses or tangentially interconnecting bands about two or more hose connection points, the possibility of independent rotation of the several hose members is significantly reduced over prior art designs. Moreover, the presence of the outer covering element as interconnected bands about two or more hose connection points ensures a high degree of hose joint assembly stability despite the optional flattening out of one or more hose stops in a hose connection intersecting region.

The hose joint assembly of the present invention furthermore allows for improved manufacturing flexibility and increased manufacturing efficiencies and economies, due in part to the unique spatial relationship of the inner connection member and outer covering element of the present invention, which is facilitated in part by the unique design of the hose stops noted supra. In a preferred embodiment, the inner connection member and/or outer covering element of the present invention are formed using injection molding techniques and molding apparatus similar to that shown in FIG. 4. According to this method a mold is used to form the outer covering elements of individual hose connection points. To form the molded hose joint assemblies, the mold for the outer covering element is installed onto an injection molding apparatus having an inner connection member with attached hoses already mounted thereon. The outer covering element mold is designed such that the appropriate corresponding portions of the mold surround individual hose connection points. The mold includes at least one internal flow path or merge cavity which is located generally between the hose connection points within the mold and in such a position as to allow molding material to flow from one hose connection point to at least one other hose connection point, thus forming a hose connection point intersecting region. According to the embodiment of the invention shown in FIGS. 1, 2 and 3, the unique hose stop design of the present invention allows respective hose connection points to be sufficiently close to one another to allow this technique to be successful with the minimum amount of molding material.

Thus, as molten molding material is injected into the mold apparatus, it is allowed to migrate from one portion of the mold to another via the internal flow paths or merge cavities, forming a unitary mass or interconnecting bands about two or more of such hose connection points, each such mass being defined as a hose connection point intersection or intersecting region. The mold may thus be designed to allow for the trunk portion of the inner connection member, being located away from the hose connection point intersections remaining free of outer covering element.

Figure 4:
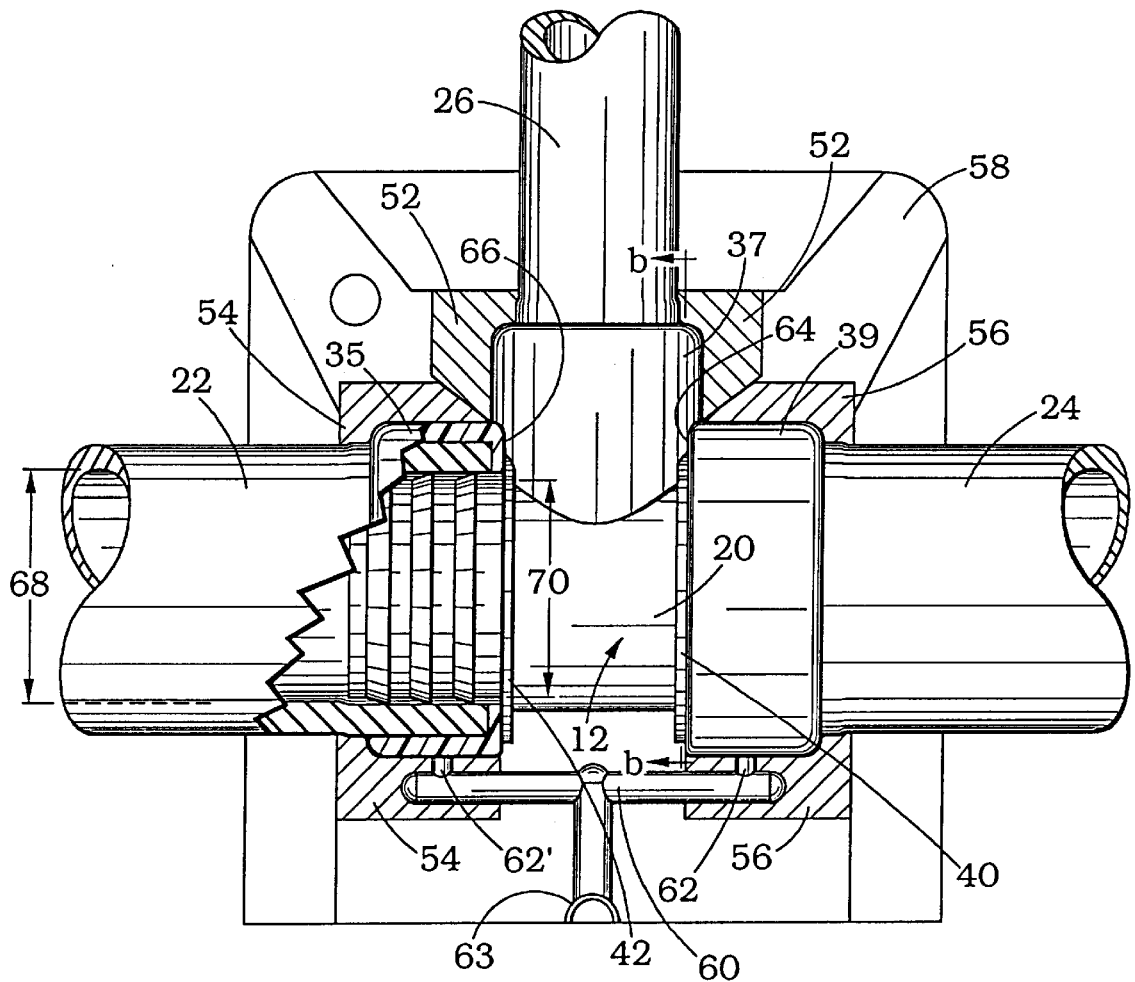
FIG. 4 is a top view of a "T"-shaped hose joint assembly mounted within molding apparatus, the figure having portions cut-away to reveal the construction of molding apparatus useful in one embodiment of the process of the present invention.

This preferred embodiment of the present invention, in addition to ensuring that independent rotation of the individual hose members and material costs are substantially reduced over prior art designs, moreover provides an opportunity to further improve manufacturing efficiencies through the use of "flexible manufacturing techniques". This term is used in this context to define a system whereby, instead of relying on dedicated molds to form every size, shape and configuration of hose joint assembly desired, a single molding apparatus may be used to form several distinct types of hose joint assemblies. In this more preferred embodiment, separate molds are used to mold the outer covering elements of individual hose connection points. These individual molds, as illustrated in FIG. 4, may conveniently be referred to as "modular insert mold blocks", or simply, "mold blocks" 52, 54, 56. According to this embodiment of the invention, to form the molded hose joint assemblies, such individual mold blocks 52, 54, 56 are installed onto an injection molding apparatus, in this case having a mold base 58 for supporting the mold blocks 52, 54, 56; at least one runner 60 for introduction of molding material from the injection port 63 to the apparatus, and at least one gate 62, 62' to facilitate the flow of molding material from the runner 60 to at least one mold block. An inner connection member 12 with attached hoses 22, 24, 26 is mounted within the injection molding apparatus, such that a mold block 52, 54, 56 surrounds each hose connection point, and portions of at least two such mold blocks abut each other in the area of a desired hose connection point intersecting region. The mold blocks 52, 54, 56 include a merge cavity 64, 66 at their point of intersection or abutment with another mold block, thus facilitating flow of molding material from one such mold block to an adjacent mold block at a given hose connection point intersection. This characteristic is evident from a view of FIG. 5, which illustrates a cross-sectional view of FIG. 4 taken on reference line b—b thereof, and results in the formation of an interconnection 72 of the outer covering element between two adjacent circumferential rings 37, 39. Thus, as molten molding material is injected into the mold apparatus, it is allowed to migrate from one such mold block to another, forming a unitary mass or capsule about two or more of such hose connection points in the form of interconnecting rings to form a hose connection point intersecting region. The trunk portion of the inner connection member however, outside of the hose connection point intersecting region, in this way remains free of outer covering element.

This more preferred embodiment of the present invention provides a mechanism whereby different types of hose joint assemblies may be formed on the same molding apparatus by designing individual or modular insert mold blocks and locating and sizing the internal flow paths or "merge cavities" of such mold blocks such that various combinations of mold blocks can be assembled on a single molding apparatus to successfully form variously shaped and sized inventive assemblies. In designing such several mold blocks, the designer should keep in mind that the internal cavities or sprues of the individual mold blocks must meet opposing sprues on adjacent mold blocks sufficiently well to allow for the flow of molding material from one hose connection point to the next, irrespective of any of the other dimensions of the mold blocks or inner connection members. Thus, as a non-limiting example, similarly shaped hose joint assemblies, each having a different combination of hoses with differing nominal inside diameters may nonetheless be formed on the same apparatus, by first forming and then placing within an otherwise-conventional molding apparatus appropriately aligned mold blocks for the different hose connection points, and in all other respects, following general molding techniques well known to the art.

A preferred application of the claimed invention is in the area of automotive and/or industrial coolant circuits, wherein the integrity of the hose joint assembly, particularly in terms of pull off and blow off, as well as overall efficiencies and economies are of paramount importance.

The inner connection member useful in the present invention may be formed from any material suitable for a given application, including thermoset materials, plastics and metals, which may or may not include typical reinforcement materials well known to the art. In the preferred embodiment of the present invention associated with the injection molding of automotive or industrial coolant hose joint assemblies, the inner connection member is preferably formed of a suitable plastics material, including nylon 6, nylon 4/6, nylon 6/6, nylon 6/12, polypropylene, or combinations thereof The hose useful in the practice of the present invention may similarly be formed of any material suitable for a given application, but in a preferred embodiment associated with automobile or industrial coolant assemblies, is an elastomer-based hose, and is more preferably formed of an ethylene-alpha-olefin copolymer or terpolymer type elastomer. Where operating pressures dictate, as in e.g., automotive applications, such hose is suitably reinforced with, e.g., metal, plastics, fabric, and/or any other type of reinforcement material known to the art, which may be of a warped or weft configuration, which may be braided or otherwise formed in conventional configurations which are all well known to the art.

The molding material for use as the outer covering element of the present invention may be formed from any material suitable for a given application, including thermoset materials and plastics, which may or may not include typical reinforcement materials well known to the art. In the preferred embodiment of the present invention associated with the injection molding of automotive or industrial coolant hose joint assemblies, the inner connection member is preferably formed of a suitable plastics material, including nylon 6, nylon 4/6 nylon 6/6, nylon 6/12, polypropylene, or combinations thereof Where operating pressures dictate, as in e.g., automotive applications, at least one of the inner connection member or outer covering element is preferably suitably reinforced with, e.g., glass, calcium carbonate, fiberglass, thermoset materials including but not limited to ethylene propylene diene terpolymer, fluorinated thermoplastics, or preferably a hygroscopic material, including but not limited to plastics such as nylon, or combinations of the foregoing. The outer covering element preferably has a gauge of from about 0.1 to about 10.0 mm, more preferably of from about 0.2 to about 7.0 mm, and most preferably of from about 0.5 to about 5.0 mm for these applications.

Figure 5:
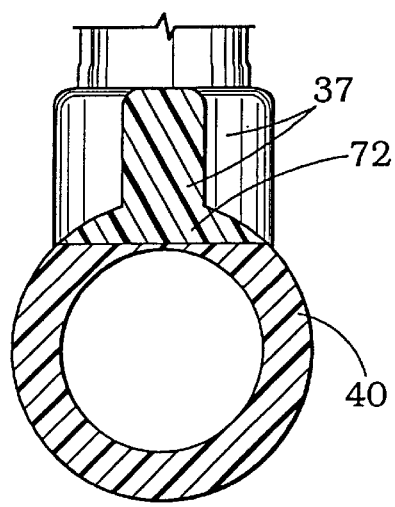
FIG. 5 is a cross-sectional side view of the hose shown in FIG. 4 cut along reference b—b thereof, to illustrate the merge cavity and resultant interconnection of one embodiment of the present invention.

For purposes of the present invention, the merge cavities between adjacent hose connection points are preferably designed to have a cross-sectional area sufficiently large, firstly, to allow for the flow of molding material from one mold block to another, and, secondly, to form an interconnection which will provide additional structural support or stability to the hose joint assembly. Notably however, where such stability is not required of a given application, and/or the molding material of choice has a relatively low viscosity, the merge cavity may be designed to be relatively small. As one having ordinary skill in the relevant art would readily recognize, a determination of the cross-sectional area required for a given merge cavity would depend largely on the viscosity of the molten molding material being used, the size of the overall hose connection piece as well as the individual dimensions of its components, the intended use of the finished piece, as well as other factors which may be readily identified. As a non-limiting example, in a preferred embodiment of the present invention directed to T-shaped automotive radiator hose joint assemblies, wherein the trunk portion has a rated hose inside diameter of 1.50 inches (3.81 cm), and the stem portion has a rated hose inside diameter of 0.75 inches (1.91 cm); the molding material used for the outer covering element is nylon 6/6; the outer covering element has a gauge of about 0.200 inches (0.51 cm); and wherein the molding operation is carried out at an injection temperature of about 350° F. (177° C.), the merge cavity and resultant interconnection possesses a generally crescent-type shape having a flattened base (as illustrated in FIG. 5), and is preferably characterized by a gauge of from about 0.15 to about 0.075 inches, preferably from about 0.100 to about 0.090 inches, and most preferably about 0.095 inches (0.241 cm) at its maximum height. The interconnection moreover has a breadth at its widest point of from about 0.90 to about 0.10 inches, more preferably from about 0.75 to about 0.35 inches, and most preferably of about 0.640 inches (1.63 cm). The interconnection is characterized by an overall cross-sectional area defined generally by the formula, $A=\frac{1}{2}[rl-c(r-h)]$, wherein A is the cross-sectional area, r is the radius of the trunk hose, l is the length of the arc created at the point where two adjacent merge cavities meet, c is the breadth of the interconnection at its broadest point, and h is the gauge of the interconnection at its highest point. In the preferred embodiment described above, the cross-sectional area of the interconnection is about 0.0304 square inches (0.1961 sq. cm.).

An additional significant benefit has surprisingly been found in the practice of an embodiment of the present invention. Prior to this finding, it was generally accepted that in relatively high pressure environments, the inner diameter of the hose end must be substantially the same as the outside diameter of the inner connection member port to adequately address blow-off concerns. Thus, lubricants including so-called volatile organic compounds or "VOCs" were routinely used to apply such hose ends to inner connection members. In the present case however, it has been surprisingly found that the integrity of the seal formed by the outer covering element about hose connection points is in many cases so great that one can actually increase the inside diameter of the hose ends relative the outside diameter of the inner connection member hose ports, without significantly increasing the risk of hose blow-off. This surprising finding, which was made in the course of testing an automotive coolant hose joint assembly of the present invention, formed of otherwise conventional ethylene propylene diene terpolymer reinforced automotive coolant hose applied to a nylon 6/6 inner connection member which was reinforced with long-aspect fiberglass, and an outer covering element formed of nylon 6/6, makes it possible to reduce or eliminate the use of lubricants, e.g., volatile organic compounds, in the application of hose ends to hose connection ports. In the present case, it was found that one could preferably increase the inner diameter of the hose end by from about four times the wall gauge of the inner connection member to about one tenth the wall gauge of the inner connection member; more preferably from about three times the wall gauge thereof to about one half the wall gauge thereof; and most preferably from about twice the wall gauge thereof to about one and one half times the wall gauge thereof, and still maintain a resistance to blow off appropriate for generally harsh conditions. This characteristic is shown in FIG. 4, wherein a hose 22 is shown having a first inner diameter 68 and a second inside diameter 70 about the hose connection port 16, which second inside diameter 70 is greater than the first inside diameter 68.

Hose joint assembly molding techniques are well known to the art. One such method is set forth for example in U.S. Pat. No. 5,033,775, the contents of which with respect to such techniques are hereby incorporated by reference. Generally, such techniques involve applying hose ends to the hose connection ports of an inner connection member to form a hose connection point; placing the thus-formed assembly into a molding apparatus; applying an outer covering element to the assembly at pressures and temperatures appropriate for the molding materials and to effect hose displacement; where thermoset materials are used as the molding material, curing the molded material, and where plastics materials are used as the molding material, allowing the molded material to cool, and; removing the thus-molded hose joint assembly from the molding apparatus.

In a preferred embodiment of the present invention associated with injection molding the outer covering element onto the hose joint assembly according to flexible manufacturing techniques, the assemblies are formed by first applying hose ends to the hose connection ports of an inner connection member to form at least two hose connection points; placing the thus-formed assembly into a molding apparatus; placing appropriately designed modular insert molding blocks into the molding apparatus such that each molding block surrounds a hose connection point and the merge cavities of at least two of the molding blocks abut one another; at a temperature and pressure appropriate for the given molding material, injecting a plastics molding material into at least one of the molding blocks; allowing the molding material to flow from one molding block to another via the merge cavities; allowing the molding material to cool, and; removing the thus-formed molded hose joint assembly from the molding apparatus. By following this method, hose joint assemblies of the present invention formed of a nylon 6/6-based inner connection member reinforced with long-aspect fiberglass, reinforced elastomer hose, and a nylon 6/6-based molded outer covering element have been molded at a cycle rate of from about 30 to about 50 seconds per unit, which cycle time is presently expected to go to from about 15 to less than about 30 seconds per unit with increased processing automation.

By eliminating a large amount of the outer covering element in the area of the inner connection member trunk compared to conventional designs, the present invention makes it possible to reduce the manufacturing costs associated with conventional molded hose joint assemblies. The unique design of the present invention allows for this increased manufacturing efficiency without sacrificing overall hose joint assembly stability; by eliminating the need for external runners or bridges the possibility of hose pull-off is furthermore reduced. Notably, by forming unitary masses or interconnecting rings about two or more hose connection points, the possibility of independent rotation of the several hose members is significantly reduced over prior art designs. Moreover, the present invention makes it possible to utilize flexible manufacturing techniques to form variously shaped and sized hose joint assemblies using a single molding apparatus and several complementary modular insert molding blocks. This possibility is facilitated in part by the unique design of the hose stop configuration of one embodiment of the present invention. This improvement presents the possibility of potentially significant cost savings by eliminating the need for a number of dedicated molds. In a preferred embodiment of the present invention, the process allows for an increased inner diameter of hose ends relative the outer diameter of the inner connection member, thus enabling the reduction or elimination of lubricants, including hazardous and expensive volatile organic compounds, in the construction of the hose joint assemblies of the present invention, without significantly impacting blow off resistance of the final assembly.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. A molded hose joint assembly comprising a substantially rigid inner connection member having at least two hose connection ports and a trunk portion; at least two flexible hose members, each said hose member being positioned on said inner connection member at one of said hose connection ports to define respective hose connection points; an outer covering element engaging at least an outer circumferential portion of each of said at least two hose members at said hose connection points, and substantially sealing said hose members to said inner connection member; and characterized in that; said outer covering element is in the form of at least two bands, each said band forming a circumferential ring about one of said hose members at at least two of said hose connection points, and interconnecting with at least one other said band to form a unitary mass about said at least two hose connection points to define a hose connection point intersecting region, and wherein the portion of said trunk portion of said inner connection member outside said intersecting region remains substantially free of said covering element, to define a non-intersecting region.

2. The molded hose joint assembly of claim 1 wherein the interconnection of the bands precludes the independent rotation of said at least two hose members.

3. The hose joint assembly of claim 1 wherein at least one of said hose connection ports includes a flange extending axially outward from the inner connection member around at least the majority of the circumference of said hose connection port, defining a hose stop, said outer covering element extending about said hose connection point to a point proximal said flange at said non-intersecting region.

4. The hose joint assembly of claim 1 wherein said inner connection member is formed in a shape selected from the group consisting of:
   (a) a T,
   (b) a Y,
   (c) an X,
   (d) an elbow having one or more stems.

5. The hose joint assembly of claim 1 wherein said inner connection member is formed of a material selected from the group consisting of:
   (a) thermoset materials;
   (b) plastics materials;
   (c) metals, and;
   (d) combinations of the foregoing.

6. The hose joint assembly of claim 5 wherein said inner connection member is formed of said plastics material, and said plastics material is one selected from the group consisting of:
   (a) nylon 6;
   (b) nylon 4/6;
   (c) nylon 6/6;
   (d) nylon 6/12;
   (e) polypropylene, and;
   (f) combinations of the foregoing.

7. The hose joint assembly of claim 1 wherein said outer covering element is formed of a material selected from the group consisting of:
   (a) thermoset materials;
   (b) plastics materials, and;
   (c) combinations of the foregoing.

8. The hose joint assembly of claim 7 wherein said outer covering element is formed of said plastics materials, and said plastics materials is one selected from the group consisting of:
   (a) nylon 6;
   (b) nylon 4/6;
   (c) nylon 6/6;
   (d) nylon 6/12;
   (e) polypropylene, and;
   (f) combinations of the foregoing.

9. The hose joint assembly of claim 1 wherein at least one of said inner connection member and said outer covering element is formed of nylon 6/6, said nylon 6/6 being reinforced with a material selected from the group consisting of:
   (a) glass;
   (b) calcium carbonate;
   (c) fiberglass;
   (d) thermoset materials;
   (e) fluorinated thermoplastics;
   (f) hygroscopic materials, and;
   (g) combinations of the foregoing.

10. The hose joint assembly of claim 9 wherein at least one of said inner connection member and said outer covering element is formed of nylon 6/6, said nylon 6/6 being reinforced with long aspect fiberglass.

11. The hose joint assembly of claim 9 in the form of an automotive coolant circuit hose joint assembly, said outer covering element having a gauge of from about 0.2 mm to about 7.0 mm.

12. The hose joint assembly of claim 2 further comprising outwardly extending circumferential ribs between terminal ends of said connection ports and said hose stops, for further engaging said hose members.

13. The hose joint assembly of claim 1 wherein at least one of said hose members has an inner diameter at said hose connection point greater than the outer diameter of said hose connection port about which it is positioned.

14. The hose joint assembly of claim 1 wherein said at least two said bands are tangentially interconnected to one another to form said unitary mass about said at least two hose connection points.

* * * * *